(12) United States Patent
Watanabe

(10) Patent No.: US 10,798,265 B1
(45) Date of Patent: Oct. 6, 2020

(54) IMAGE READING DEVICE AND IMAGE FORMING APPARATUS

(71) Applicant: FUJI XEROX CO., LTD., Tokyo (JP)

(72) Inventor: Hiroshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/558,158

(22) Filed: Sep. 2, 2019

(30) Foreign Application Priority Data

Mar. 18, 2019 (JP) .................................. 2019-049722

(51) Int. Cl.
*H04N 1/04* (2006.01)
*H04N 1/10* (2006.01)
*H04N 1/193* (2006.01)

(52) U.S. Cl.
CPC ........... *H04N 1/1043* (2013.01); *H04N 1/103* (2013.01); *H04N 1/1026* (2013.01); *H04N 1/193* (2013.01)

(58) Field of Classification Search
CPC .... H04N 1/1043; H04N 1/1026; H04N 1/103; H04N 1/193
USPC ................................ 358/497, 474, 482, 483
See application file for complete search history.

(56) References Cited

U.S. PATENT DOCUMENTS

| | | | |
|---|---|---|---|
| 6,985,269 B1 | 1/2006 | Takeuchi | |
| 7,072,082 B2* | 7/2006 | Yokota | H04N 1/0464 250/208.1 |
| 7,088,476 B2* | 8/2006 | Yokota | H04N 1/03 358/474 |
| 7,746,522 B2* | 6/2010 | Oguri | H04N 1/0313 358/474 |
| 7,804,625 B2* | 9/2010 | Osakabe | H04N 1/1017 358/474 |
| 8,570,618 B2* | 10/2013 | Washida | H04N 1/00557 358/474 |
| 8,854,705 B2* | 10/2014 | Liu | H04N 1/1039 358/471 |
| 8,922,848 B2* | 12/2014 | Yamasaki | H04N 1/02481 358/474 |
| 8,928,958 B2* | 1/2015 | Yamasaki | H04N 1/1017 358/484 |
| 9,118,799 B2* | 8/2015 | Otomo | H04N 1/1017 |
| 9,357,090 B2* | 5/2016 | Hozono | H04N 1/00549 |
| 9,854,113 B1* | 12/2017 | Lin | H04N 1/103 |
| 2001/0043371 A1* | 11/2001 | Takahara | H04N 1/03 358/471 |
| 2003/0039486 A1* | 2/2003 | Bannai | G03G 15/04 399/211 |
| 2003/0081275 A1* | 5/2003 | Shishido | H04N 1/0464 358/509 |

(Continued)

FOREIGN PATENT DOCUMENTS

JP 2001083623 3/2001
JP 2003078719 3/2003

(Continued)

*Primary Examiner* — Cheukfan Lee
(74) *Attorney, Agent, or Firm* — JCIPRNET

(57) ABSTRACT

An image reading device includes an image reading unit that reads an image while moving in a sub-scanning direction, a casing that houses the image reading unit, a guiding member that is movable relative to the casing in the sub-scanning direction and guides the casing in the sub-scanning direction, and an endless member to which the casing is fixed and that endlessly travels between a starting position and a terminal position in the sub-scanning direction.

20 Claims, 15 Drawing Sheets

(56) References Cited

U.S. PATENT DOCUMENTS

| | | | | |
|---|---|---|---|---|
| 2005/0088706 A1* | 4/2005 | Lin | ............... | H04N 1/0313 |
| | | | | 358/474 |
| 2006/0059660 A1* | 3/2006 | Chen | ............... | H04N 1/1017 |
| | | | | 16/342 |
| 2006/0209364 A1* | 9/2006 | Nagatani | ............... | H04N 1/1017 |
| | | | | 358/474 |
| 2007/0146817 A1* | 6/2007 | Osakabe | ............... | H04N 1/1017 |
| | | | | 358/474 |
| 2007/0165289 A1* | 7/2007 | Osakabe | ............... | H04N 1/031 |
| | | | | 358/488 |
| 2010/0128328 A1* | 5/2010 | Hozono | ............... | H04N 1/03 |
| | | | | 358/474 |
| 2012/0281259 A1* | 11/2012 | Osakabe | ............... | H04N 1/1026 |
| | | | | 358/474 |
| 2014/0240802 A1* | 8/2014 | Otomo | ............... | H04N 1/1026 |
| | | | | 358/497 |

FOREIGN PATENT DOCUMENTS

| | | | |
|---|---|---|---|
| JP | 2003158614 | | 5/2003 |
| JP | 2019054332 | A * | 4/2019 |

* cited by examiner

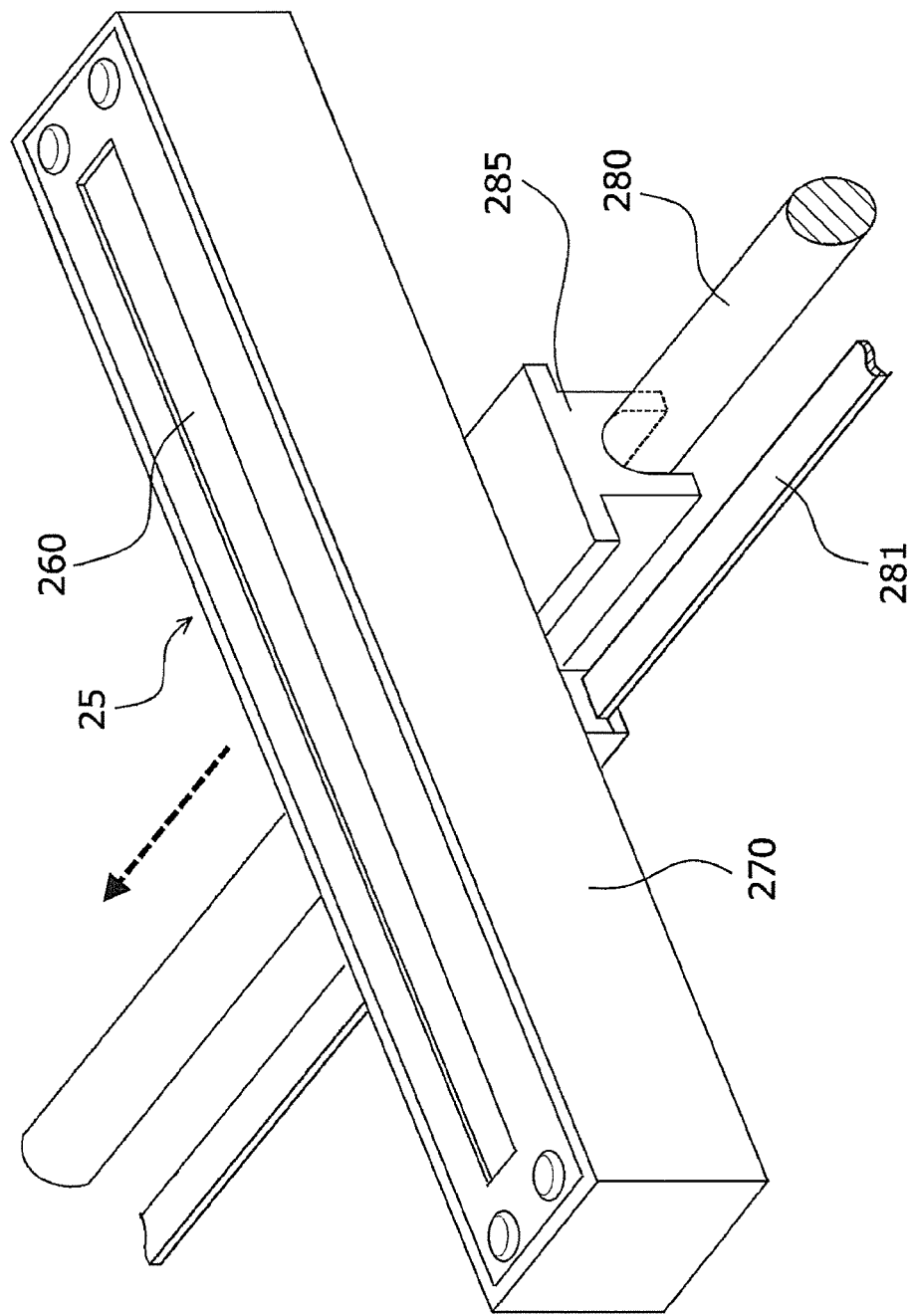

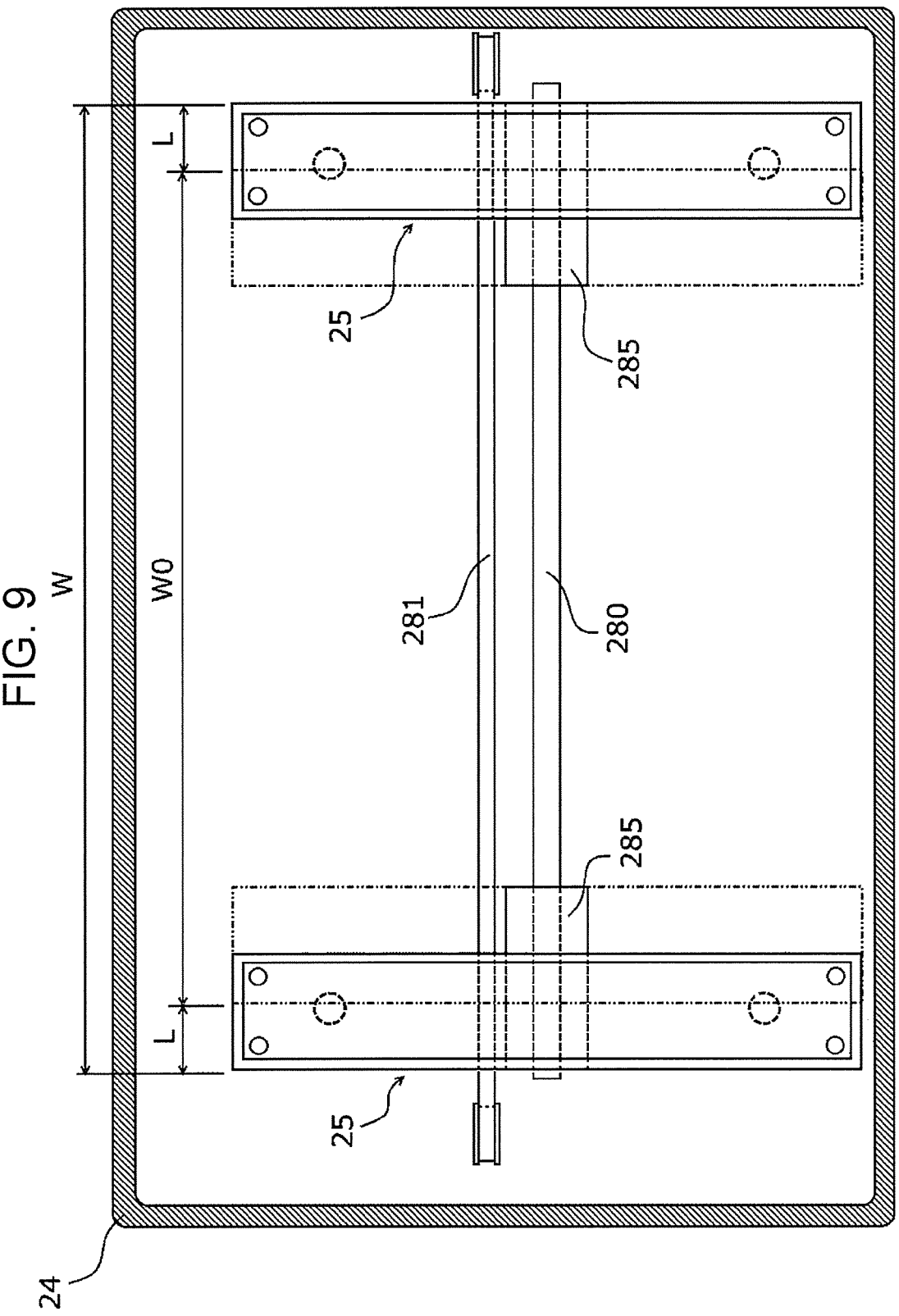

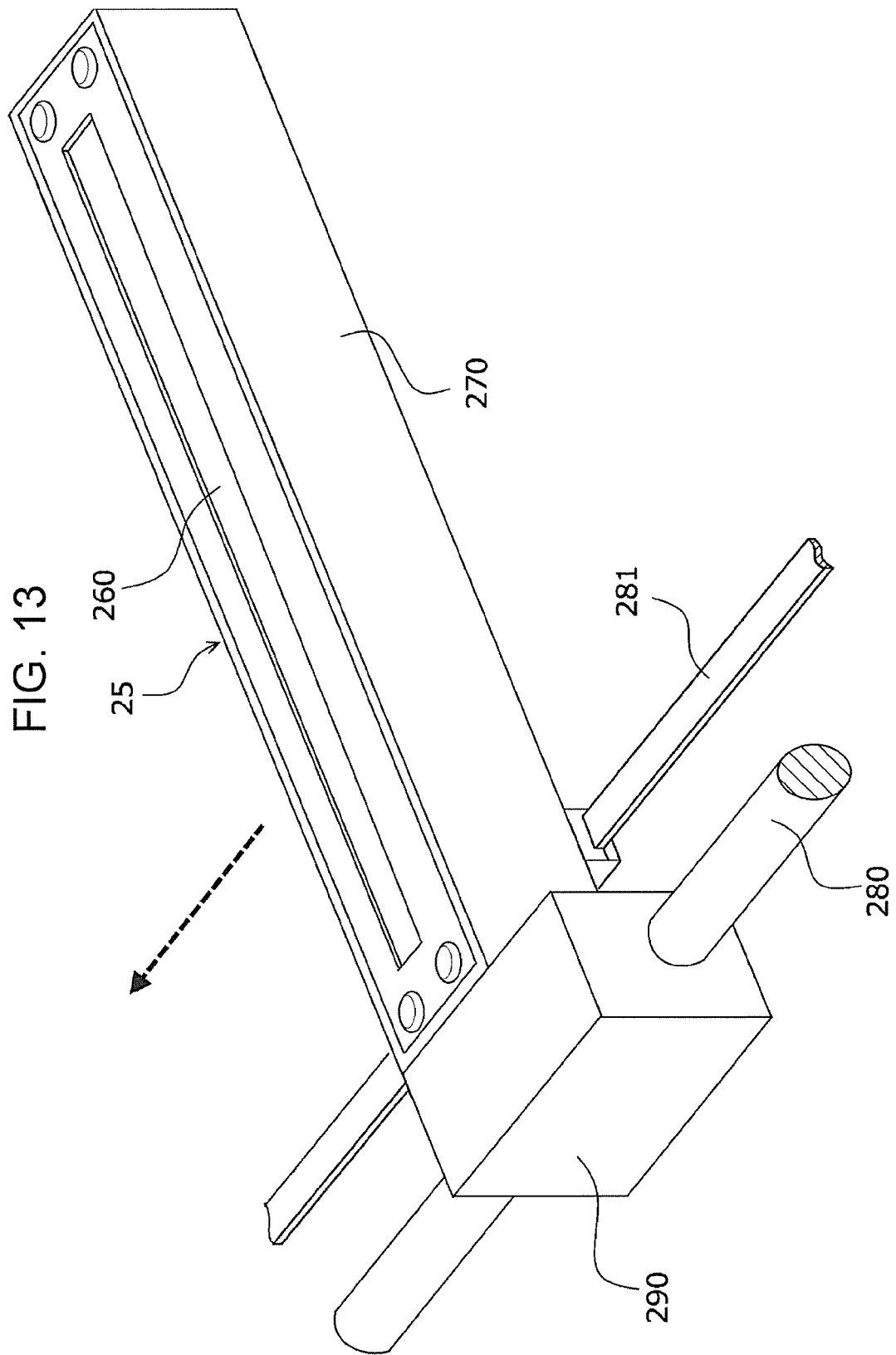

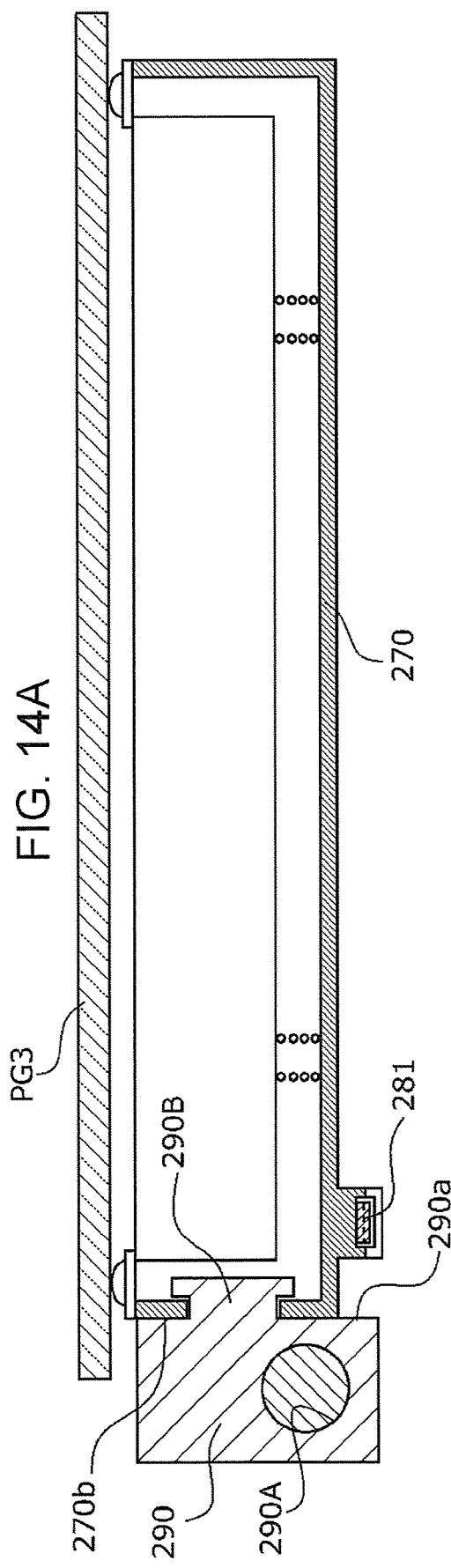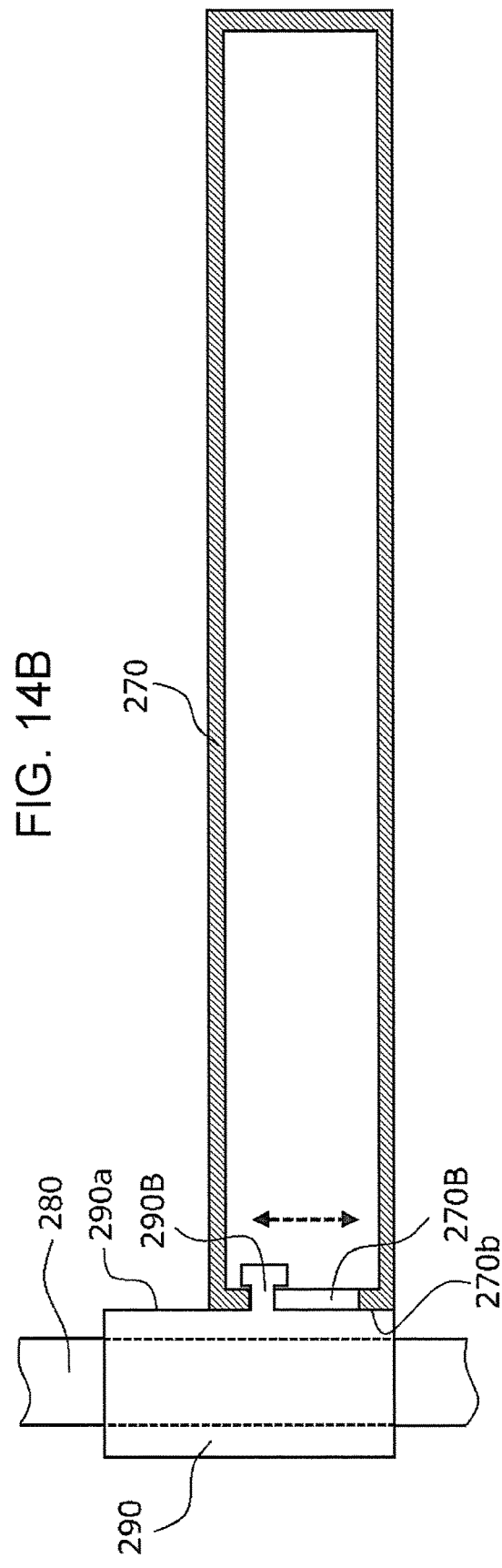

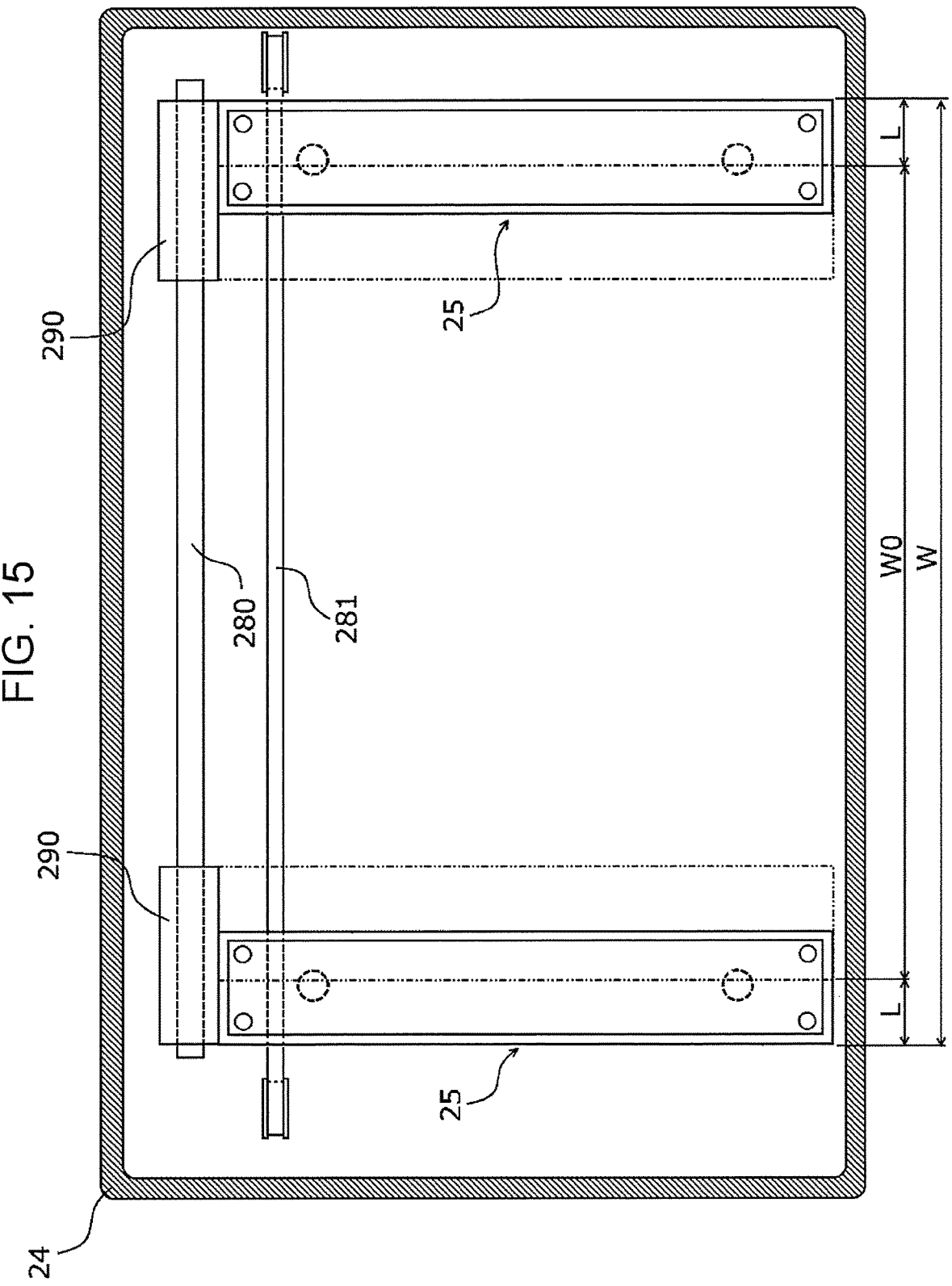

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2019-049722 filed Mar. 18, 2019.

BACKGROUND

(i) Technical Field

The present disclosure relates to an image reading device and an image forming apparatus.

(ii) Related Art

An image reading device disclosed by Japanese Unexamined Patent Application Publication No. 2003-158614 includes an original placing unit having at least one translucent plate member, an image reading unit that moves parallel to the original placing unit and reads an image on an original placed on the original placing unit, a holding unit that holds the image reading unit, a drive unit that drives the image reading unit, and a guide member that guides the movement of the image reading unit. The guide member is provided with a fixed sliding member fixed to the holding unit while being slidable on the guide member, and a press-sliding member slidable on the holding unit while being slidably pressed against the guide member.

An image reading device disclosed by Japanese Unexamined Patent Application Publication No. 2001-083623 includes an image reading unit that performs scanning along a flat surface of a translucent member, a mesh member that moves the image reading unit, and a rail member that guides the image reading unit. The image reading device reads an image on an original through the translucent member by using the image reading unit. The orientation of the image reading unit is retained with a tension exerted by the mesh member.

SUMMARY

Aspects of non-limiting embodiments of the present disclosure relate to an image reading device that is smaller than an image reading device in which a casing and a guiding member that guides the casing in a sub-scanning direction are fixed to each other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading device including an image reading unit that reads an image while moving in a sub-scanning direction, a casing that houses the image reading unit, a guiding member that is movable relative to the casing in the sub-scanning direction and guides the casing in the sub-scanning direction, and an endless member to which the casing is fixed and that endlessly travels between a starting position and a terminal position in the sub-scanning direction.

BRIEF DESCRIPTION OF THE DRAWINGS

An exemplary embodiment of the present disclosure will be described in detail based on the following figures, wherein:

FIG. 7 is a perspective view of a carriage guiding mechanism;

FIG. 9 is a schematic plan view illustrating how the carriage moves in a case of the image reading device;

FIG. 13 is a perspective view of a carriage guiding mechanism in which the guide is attached to a side face of a housing of the carriage;

FIG. 14A is a schematic sectional view illustrating how the guide is attached to the carriage;

FIG. 14B is a schematic plan view illustrating how the guide is attached to the carriage, with the reading portion not illustrated; and FIG. 15 is a schematic plan view illustrating how the carriage moves in the case of the image reading device.

DETAILED DESCRIPTION

Figure 1:
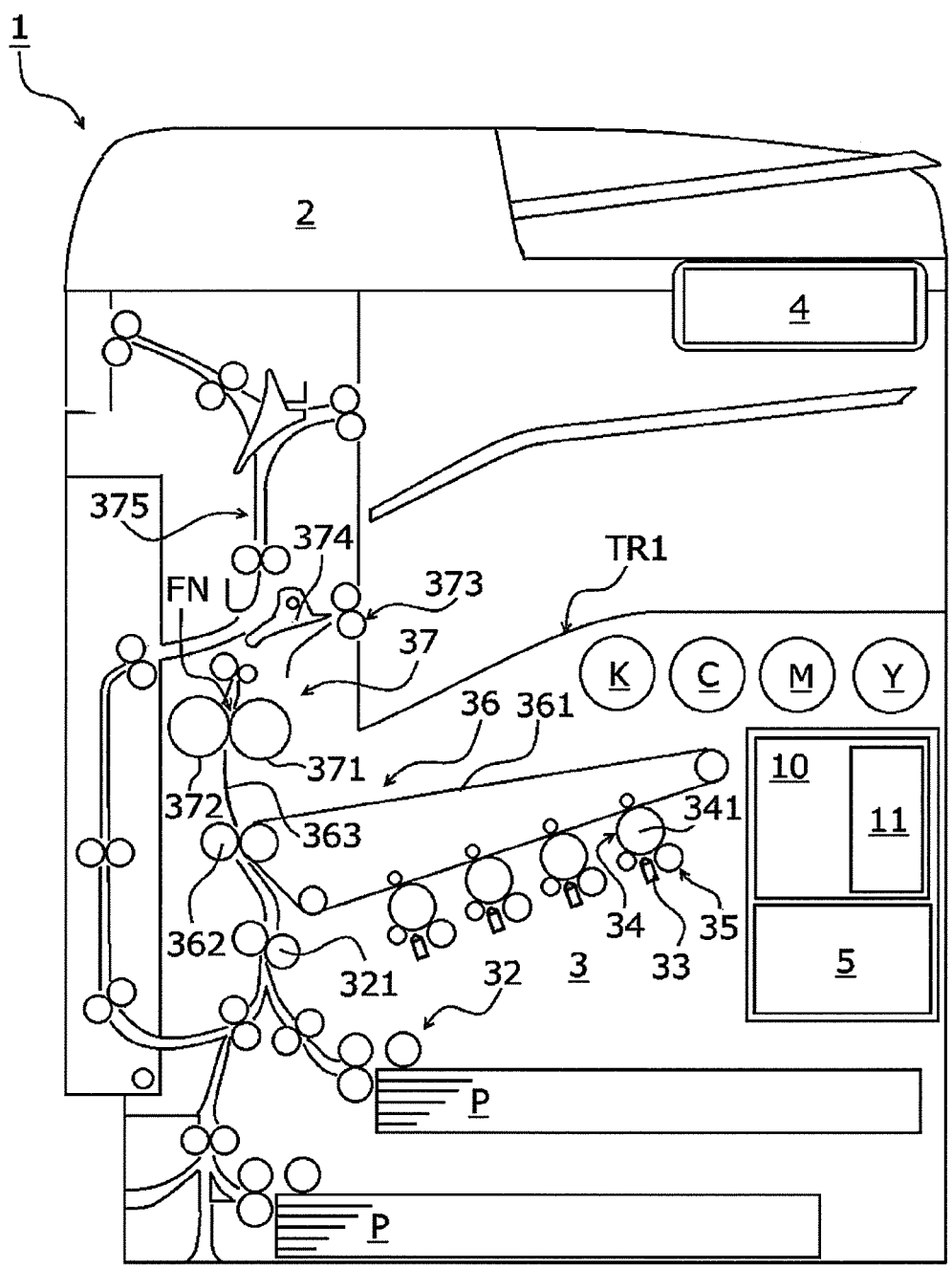
FIG. 1 is a schematic sectional view illustrating an internal configuration of an image forming apparatus.

The present disclosure will now be described in detail with reference to the drawings and with an exemplary embodiment and specific examples. The present disclosure is not limited to the following exemplary embodiment and examples.

It should be noted that the drawings to be referred to below are only schematic and are not necessarily to scale. For easy understanding, irrelevant elements are not illustrated in the drawings.

(1) Overall Configuration and Operation of Image Forming Apparatus

Figure 2:
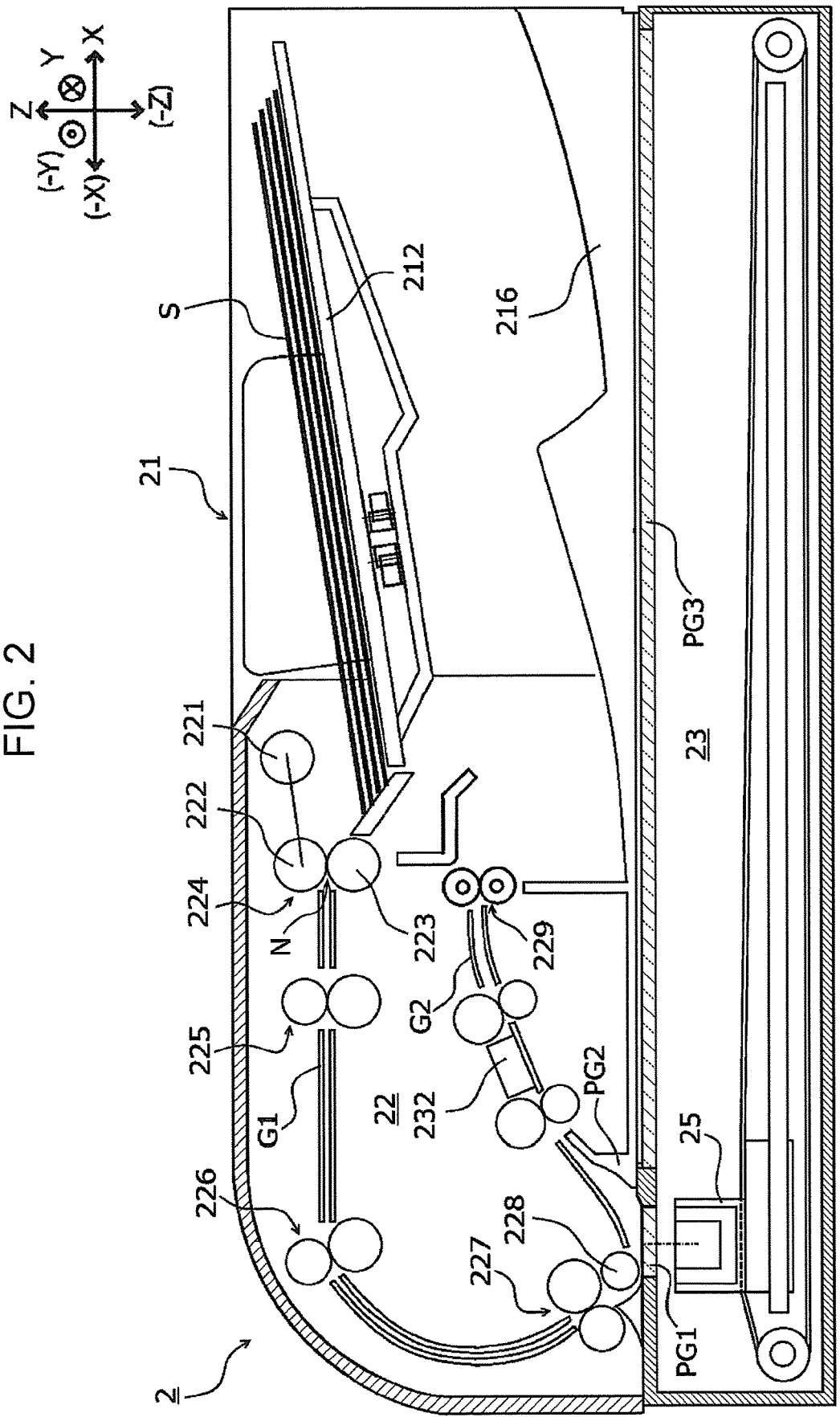
FIG. 2 is a sectional view illustrating an internal configuration of an image reading device.
Figure 3:
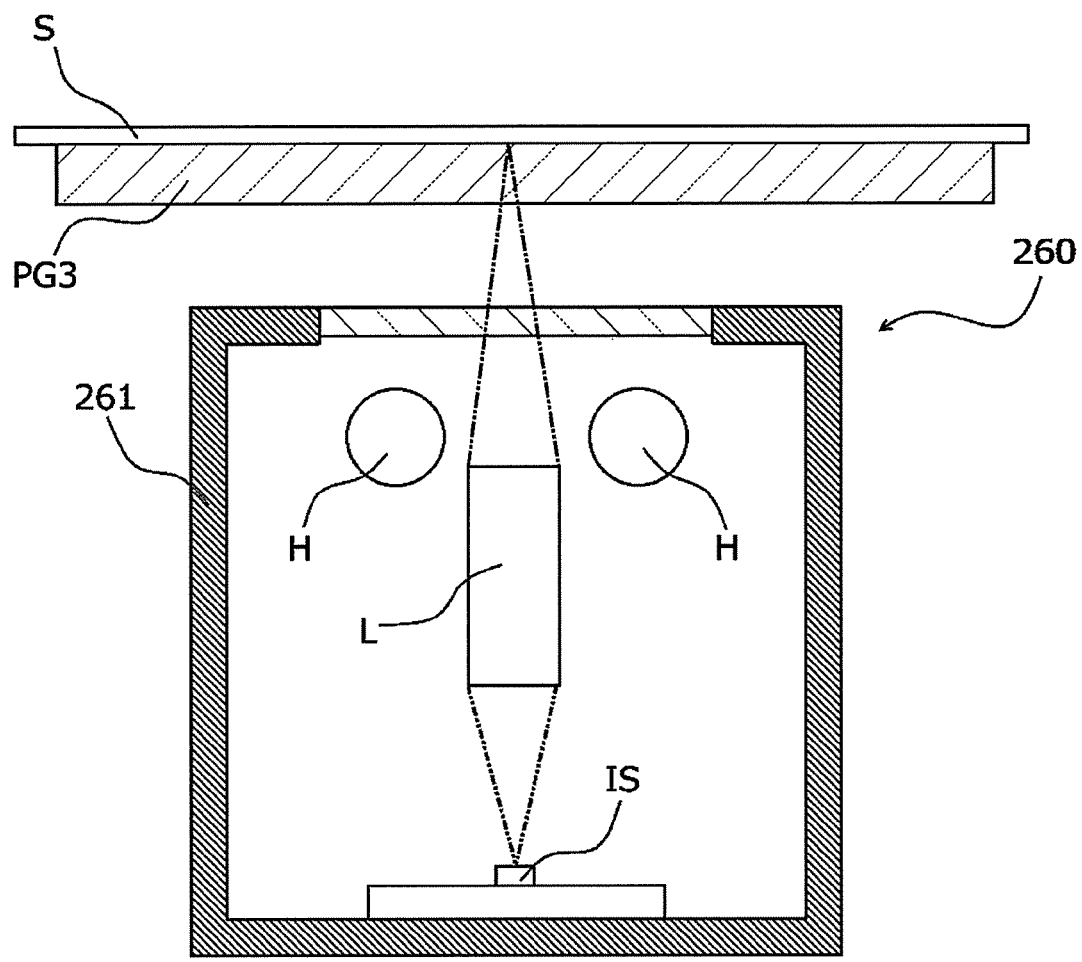
FIG. 3 is a schematic sectional view illustrating a reading portion of the image reading device.

FIG. 1 is a schematic sectional view illustrating an internal configuration of an image forming apparatus 1 according to an exemplary embodiment. FIG. 2 is a sectional view illustrating an internal configuration of an image reading device 2. FIG. 3 is a schematic sectional view illustrating a reading portion 260 of the image reading device 2. Referring to FIGS. 1 to 3, an overall configuration and operation of the image forming apparatus 1 will now be described.

(1.1) Overall Configuration

The image forming apparatus 1 includes the image reading device 2 that reads an image from a sheet S such as an original and converts the read image into image data, an image forming unit 3 as an image recording unit that prints the read image data on a piece of paper P as a recording medium, an operation information unit 4 as a user interface, and an image processing unit 5.

The image reading device 2 includes a sheet stacking portion 21, an automatic sheet feeder 22, and an image reader 23. The automatic sheet feeder 22 transports sheets S one by one from the sheet stacking portion 21 to a reading position defined for the image reader 23. An image on each sheet S is read by an image sensor IS, such as a charge-coupled-device (CCD) line sensor, included in the image reader 23. The read image is converted into image data in the form of an electrical signal.

The image forming unit 3 includes a paper feeding device 32, exposure devices 33, photoconductor units 34, developing devices 35, a transfer device 36, and a fixing device 37. The image forming unit 3 receives the image data from the image processing unit 5 and forms a toner image corresponding to the image data on a piece of paper P that is fed from the paper feeding device 32.

The image reading device 2 is provided with the operation information unit 4 as a user interface on the front face thereof. The operation information unit 4 is a combination of a liquid-crystal panel, various operation buttons, a touch panel, and so forth. A user of the image forming apparatus 1 inputs various settings and instructions through the operation information unit 4. On the other hand, relevant pieces of information are provided to the user of the image forming apparatus 1 through the liquid-crystal panel.

The image processing unit 5 generates image data from the image read by the image reading device 2 and printing information received from an external apparatus (such as a personal computer).

(1.2) Image Forming Unit

A piece of paper P designated for each of pages defined in a print job is fed from the paper feeding device 32 to the image forming unit 3 in accordance with the timing of image formation.

The photoconductor units 34 are provided above the paper feeding device 32 and are arranged in parallel. The photoconductor units 34 include respective photoconductor drums 341 that are rotatable. The exposure devices 33 form respective electrostatic latent images on the respective photoconductor drums 341. The developing devices 35 develop the respective electrostatic latent images into respective toner images in yellow (Y), magenta (M), cyan (C), and black (K).

The toner images in the respective colors formed on the respective photoconductor drums 341 of the photoconductor units 34 are sequentially electrostatically transferred (in first transfer) to an intermediate transfer belt 361 included in the transfer device 36, whereby the toner images in the respective colors are superposed one on top of another. The toner images thus superposed on the intermediate transfer belt 361 are collectively transferred by a second transfer roller 362 to a piece of paper P transported from a pair of registration rollers 321 while being guided along a transport guide 363.

The fixing device 37 includes a heating module 371 and a pressing module 372 provided as a pair and pressed against each other to form a fixing nip FN (a fixing area).

The piece of paper P having the toner images collectively transferred thereto by the transfer device 36 but yet to be fixed is transported to the fixing nip FN in the fixing device 37 along the transport guide 363. Then, the toner images are heated and pressed between the heating module 371 and the pressing module 372, thereby being fixed.

The piece of paper P having the fixed toner image is guided by a switching gate 374 and is outputted by a pair of first output rollers 373 onto a paper-output tray portion TR1 provided on an upper surface of the image forming apparatus 1. If the piece of paper P is to be reversely transported for duplex printing or is to be outputted with an image recording side thereof facing upward, the direction of transport is switched by the switching gate 374 such that the piece of paper P advances into a transport path 375.

(1.3) Image Reading Device

The sheet stacking portion 21 includes a sheet tray 212 on which sheets S each having images are to be stacked.

The automatic sheet feeder 22 includes a nudger roller 221, and a separator 224 including a feed roller 222 and a retard roller 223. The nudger roller 221 nudges the sheets S on the sheet tray 212 one by one from the top.

If some sheets S are fed at a time into a nip N between the feed roller 222 and the retard roller 223 working as a pair forming the separator 224, the sheets S are separated from one another and are transported one by one to the image reader 23.

A sheet transport path G1 is provided with a takeaway roller 225 on the downstream side with respect to the feed roller 222 in the direction of transport of the sheet S. The takeaway roller 225 receives the sheet S from the feed roller 222 and transports the sheet S to a pre-registration roller 226.

A registration roller 227 that adjusts the timing of transporting the sheet S is provided on the downstream side with respect to the pre-registration roller 226. The pre-registration roller 226 forms a loop in the sheet S by bringing the leading end of the sheet S into contact with the registration roller 227 that is not rotated, thereby correcting any skew in the sheet S. The registration roller 227 is rotated in accordance with the timing of starting reading. Then, the sheet S having the loop retained by the takeaway roller 225 and the pre-registration roller 226 is pressed against a sheet passing surface PG1 by a platen roller 228. In this state, the front surface of the sheet S is read by the image reader 23.

The sheet S that has passed over the sheet passing surface PG1 is guided toward a reading sensor 232 by a sheet guide PG2 provided on the right side, in FIG. 2, with respect to the sheet passing surface PG1. The sheet S whose front surface has been read by the image reader 23 is transported along a sheet transport path G2 while the back surface thereof is red by the reading sensor 232, and is outputted by an output roller 229 onto a sheet output tray 216 provided below the sheet stacking portion 21.

The image reader 23 has a case 24. The case 24 is provided at the top thereof with a platen glass PG3 on which a sheet S is to be placed. The case 24 houses a carriage 25 that is movable back and forth in a sub-scanning direction (a lateral direction, i.e. the X direction). The direction in which the carriage 25 moves is hereinafter simply referred to as "the moving direction".

As illustrated in FIG. 3, the carriage 25 includes lamps H that apply light to the sheet S placed on the platen glass PG3, an imaging lens L that forms an image at a predetermined magnification from the light reflected by the sheet S, and the image sensor IS (a solid-state imaging device including a complementary metal-oxide semiconductor (CMOS)). The image sensor IS serves as a reading sensor that reads the image on the sheet S. The image sensor IS generates an analog image signal corresponding to the light reflected by the sheet S.

If a sheet S is placed on the platen glass PG3, the carriage 25 reads an image on the sheet S line by line while moving in the sub-scanning direction (the X direction). Thus, while the light reflected by the sheet S is guided to the image sensor IS, the entirety of the image on the sheet S is read.

(2) Relevant Elements and Operation of Image Reading Device

Figure 4:
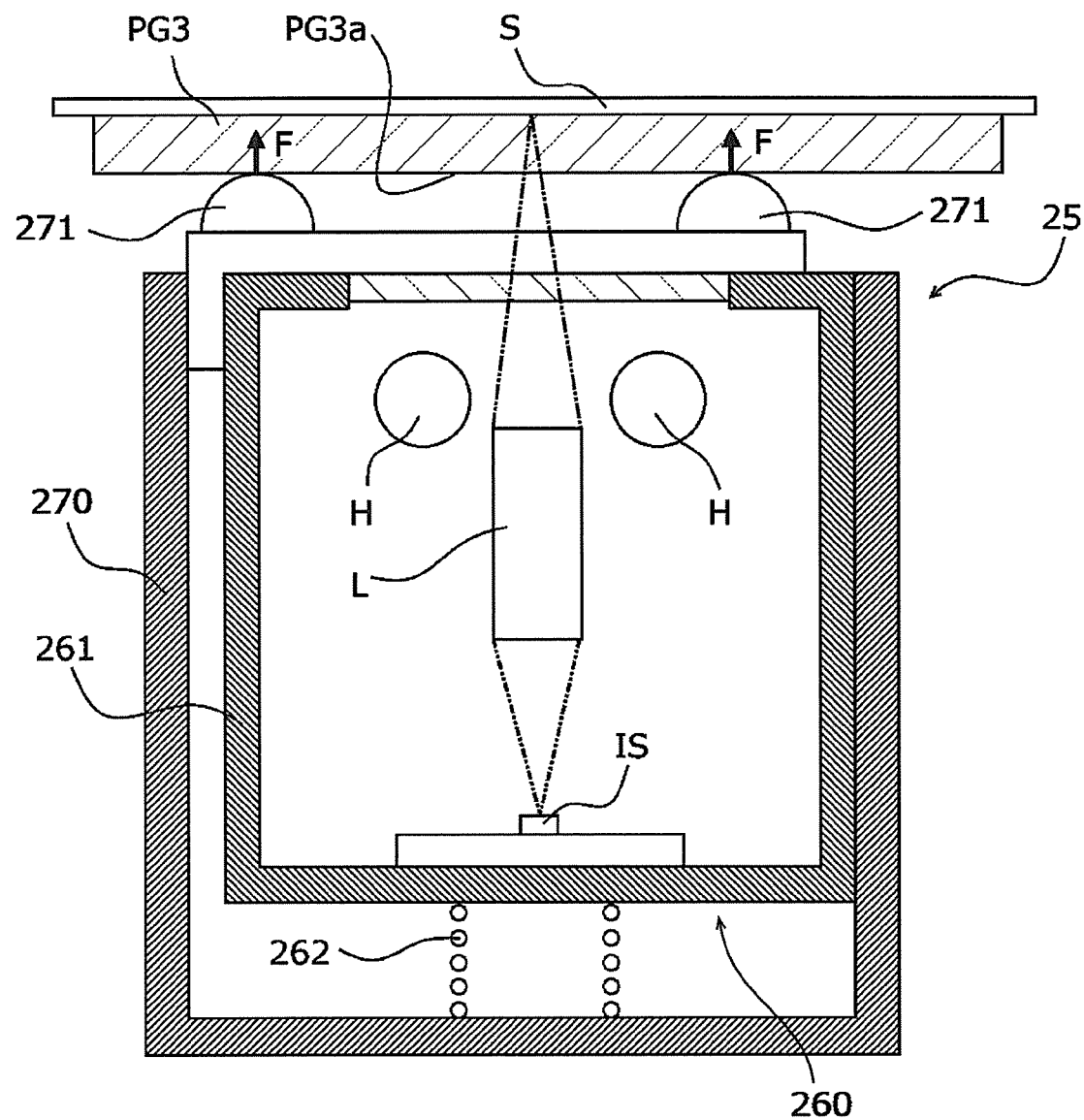
FIG. 4 is a schematic sectional view illustrating how a carriage is positioned with respect to a platen glass.
Figure 5:
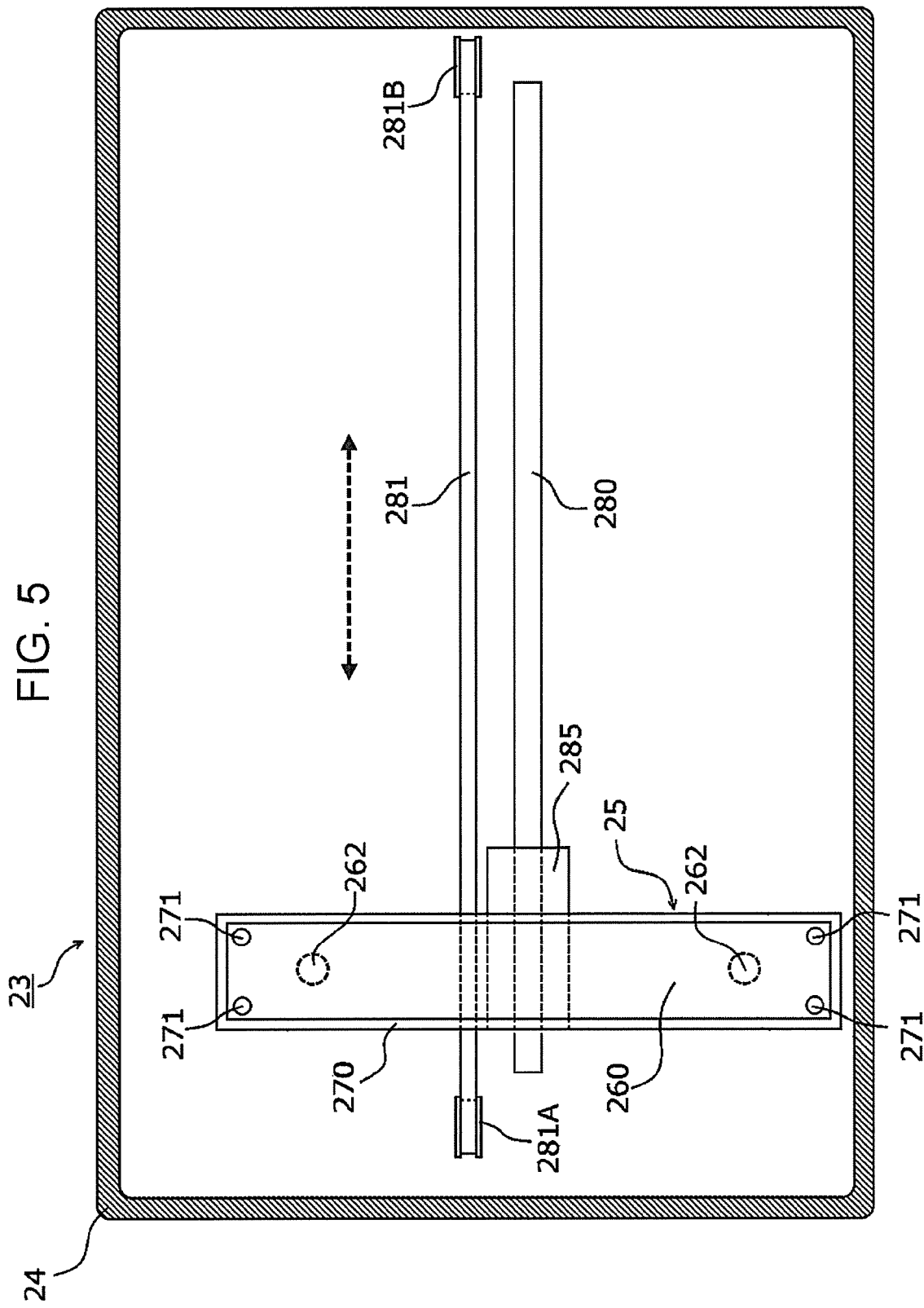
FIG. 5 is a schematic plan view of an image reader included in the image reading device.
Figure 6:
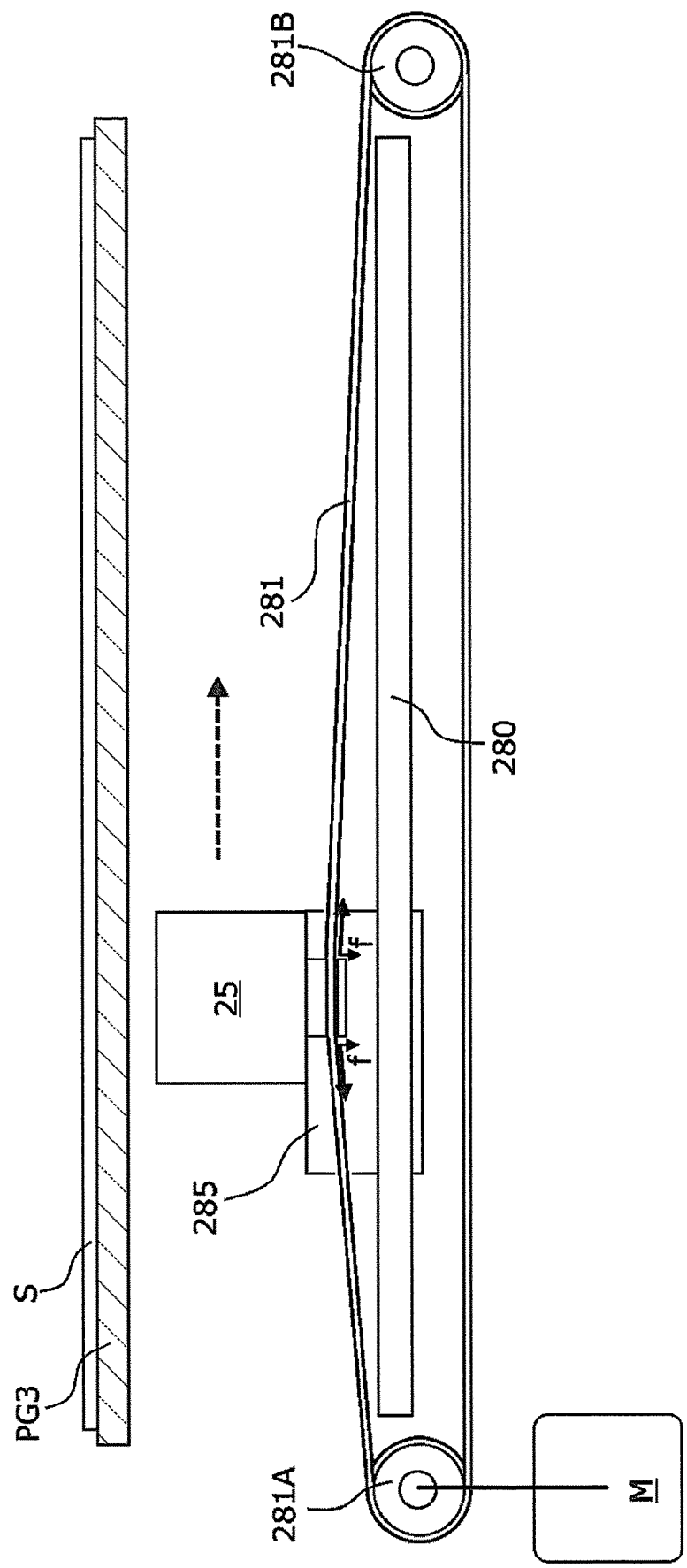
FIG. 6 is a schematic sectional view illustrating how a belt is stretched.
Figure 8A:
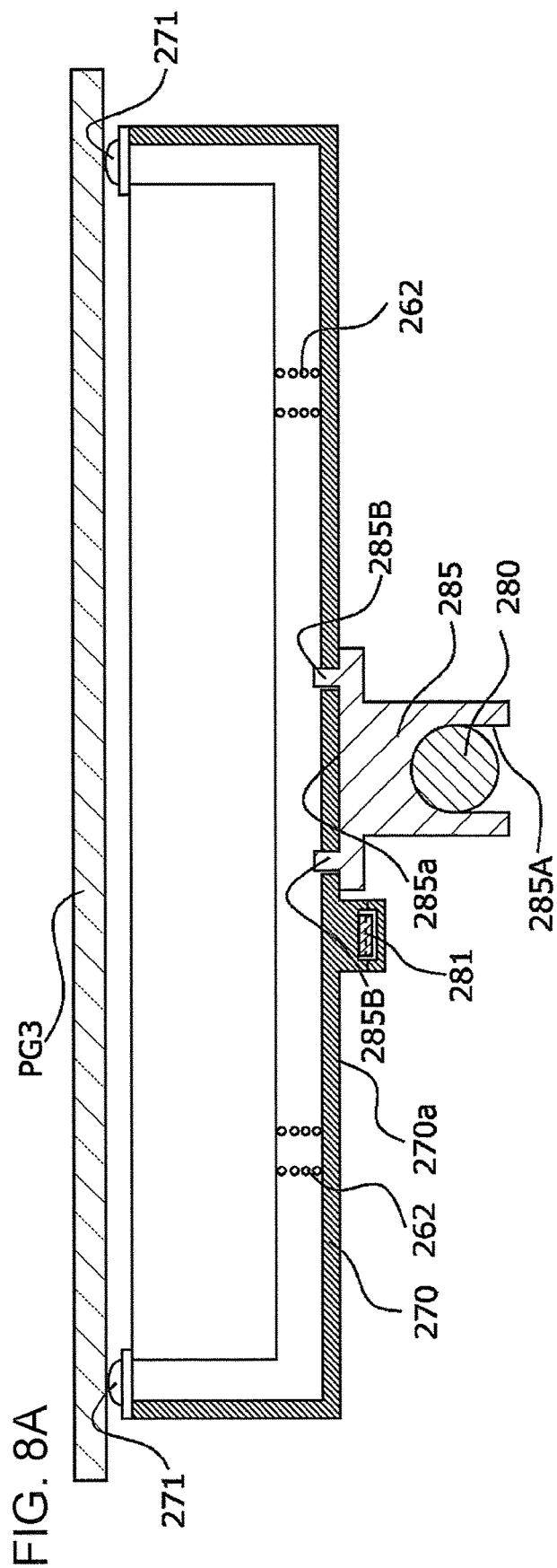
FIG. 8A is a schematic sectional view illustrating how a guide is attached to the carriage.
Figure 8B:
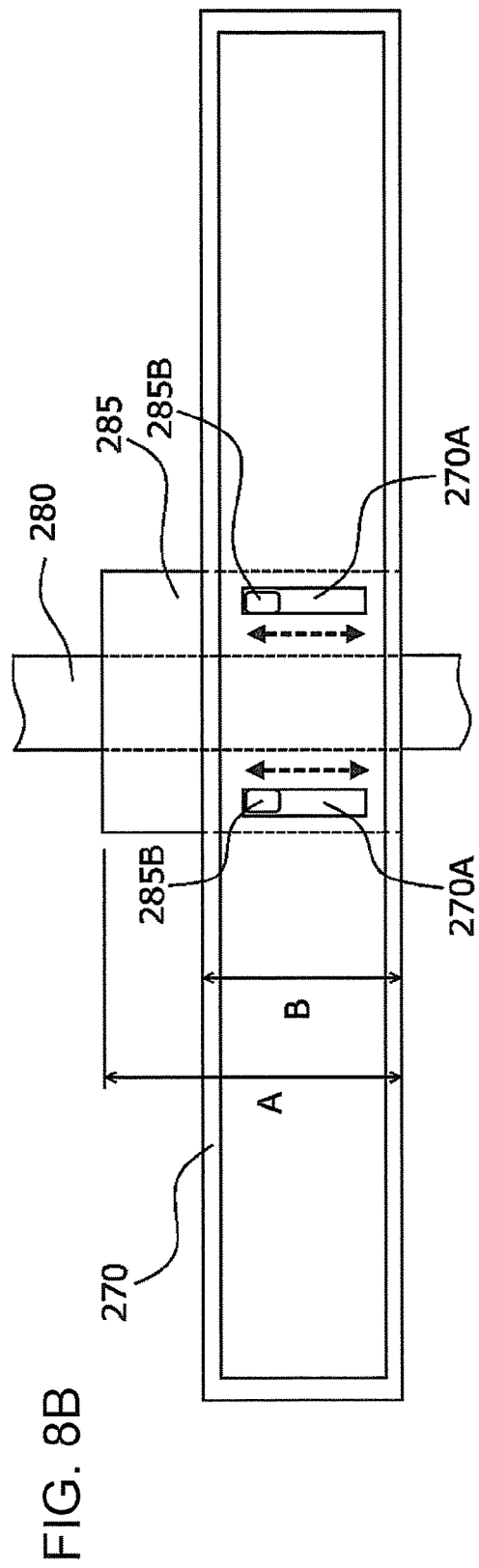
FIG. 8B is a schematic plan view illustrating how the guide is attached to the carriage, with the reading portion not illustrated.
Figure 10:
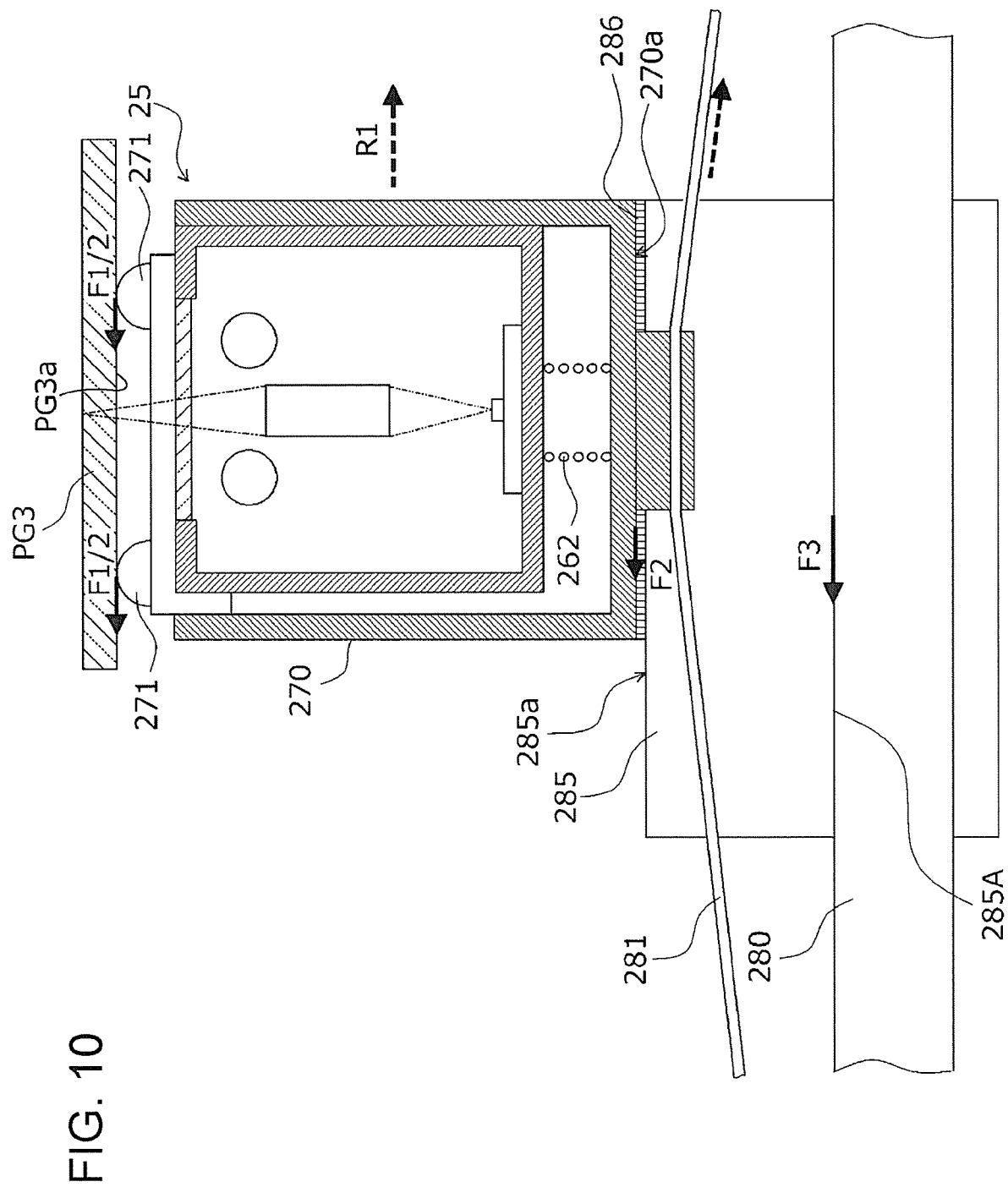
FIG. 10 is a schematic sectional view illustrating frictional forces acting on the carriage guiding mechanism.

FIG. 4 is a schematic sectional view illustrating how the carriage 25 is positioned with respect to the platen glass PG3. FIG. 5 is a schematic plan view of the image reader 23 included in the image reading device 2. FIG. 6 is a schematic sectional view illustrating how a belt 281 is stretched. FIG. 7 is a perspective view of a carriage guiding mechanism. FIG. 8A is a schematic sectional view illustrating how the guide 285 is attached to the carriage 25. FIG. 8B is a schematic plan view illustrating how the guide 285 is attached to the carriage 25, with the reading portion 260 not illustrated. FIG. 9 is a schematic plan view illustrating how the carriage 25 moves in the case 24 of the image reading device 2. FIG. 10 is a schematic sectional view illustrating frictional forces acting on the carriage guiding mechanism.

(2.1) Carriage

The carriage 25 includes the reading portion 260, and a housing 270 that houses the reading portion 260. The housing 270 is an exemplary casing and has a box-like shape elongated in the depth direction of the image reading device 2.

As illustrated in FIG. 4, the reading portion 260 includes a reading-portion body 261 in which the lamps H formed of light-emitting diodes (LEDs), the imaging lens L, and the image sensor IS are provided. The reading portion 260 further includes urging members 262. The urging members 262 may be coil springs or the like. The upper ends of the urging members 262 are attached to the lower surface of the reading-portion body 261. The lower ends of the urging members 262 are attached to the upper surface of the housing 270.

The housing 270 has projections 271 at two ends thereof in a direction intersecting the moving direction. The projections 271 are made of highly slidable synthetic resin such as polyacetal (polyoxymethylene, hereinafter abbreviated to POM). The urging members 262 urge the reading-portion body 261 upward. Accordingly, the projections 271 are pressed (see arrows F illustrated in FIG. 4) against a back surface PG3a of the platen glass PG3, whose front surface serves as an image reading surface. Thus, the reading portion 260 is positioned with respect to the platen glass PG3 in the vertical direction (the direction of gravitational force).

(2.2) Carriage Guiding Mechanism

As illustrated in FIG. 5, the carriage 25 is mounted on a guiding shaft 280 in such a manner as to be movable therealong. The guiding shaft 280 extends in the long-side direction of the case 24, i.e. the sub-scanning direction. The case 24 is provided with the belt 281 as an exemplary endless member in a central part thereof in the direction intersecting the moving direction. The belt 281 is stretched between pulleys 281A and 281B and endlessly travels between a starting position and a terminal position in the sub-scanning direction.

As illustrated in FIG. 6, part of the belt 281 is fixed to the carriage 25. The belt 281 is stretched such that tension components f acting in a downward direction (the −Z direction) intersecting the direction in which the belt 281 moves are generated between the starting position and the terminal position in the sub-scanning direction. Since the belt 281 stretched as above travels endlessly, the carriage 25 moving back and forth in the sub-scanning direction along the guiding shaft 280 (see arrows illustrated in FIGS. 5 and 6) causes less rattling in the vertical direction intersecting the sub-scanning direction.

The carriage 25 is provided with a guide 285 as an exemplary guiding member. The guide 285 is attached to a lower surface 270a of the housing 270 in a central part in the direction intersecting the moving direction. As illustrated in FIG. 8A, the guide 285 has a sliding surface 285A having a semicircular shape when seen in the moving direction. The guide 285 slides on the guiding shaft 280 at the sliding surface 285A.

As illustrated in FIG. 8B, a length A of the guide 285 in the moving direction is greater than a length B of the housing 270 in the moving direction. Therefore, the carriage 25 is less susceptible to the moment of rotation applied thereto when moving in the sub-scanning direction along the guiding shaft 280.

As illustrated in FIG. 8A, the guide 285 has an attaching surface 285a having bosses 285B. When the guide 285 is oriented to be attached to the carriage 25, the bosses 285B project toward the lower surface 270a of the housing 270. As illustrated in FIG. 8B, the lower surface 270a of the housing 270 has oblong holes 270A in which the bosses 285B are fitted, respectively. Therefore, the guide 285 is movable relative to the housing 270 in the moving direction within a range defined by the length of the major axis of the oblong holes 270A (see arrows illustrated in FIG. 8B).

As described above, the guide 285 is attached to the housing 270 in such a manner as to be movable relative to the housing 270 in the moving direction (the sub-scanning direction). Therefore, referring to FIG. 9, as the belt 281 fixed to the housing 270 of the carriage 25 travels, the carriage 25 moves between the extreme ends of a movable range W (as illustrated by solid lines in FIG. 9) by moving relative to the guide 285, i.e. independently of the guide 285, at the extreme ends in the moving direction.

Consequently, the movable range of the carriage 25 is extended (by a length L illustrated in FIG. 9) at each of two ends of a movable range W0 realized in a case where the guide 285 is fixedly attached to the housing 270 of the carriage 25 (illustrated by two-dot chain lines in FIG. 9).

FIG. 10 schematically illustrates frictional forces acting on the carriage guiding mechanism when the carriage 25 moves in the sub-scanning direction. Referring to FIG. 10, in a case where the carriage 25 moves in a direction R1 with the traveling of the belt 281, a friction coefficient $\mu 1$ between the back surface PG3a of the platen glass PG3 opposite the image reading surface and each of the projections 271 is greater than a friction coefficient $\mu 2$ between the lower surface 270a of the housing 270 and the attaching surface 285a of the guide 285. Furthermore, a friction coefficient $\mu 3$ between the sliding surface 285A of the guide 285 and the guiding shaft 280 is greater than the friction coefficient $\mu 2$ between the lower surface 270a of the housing 270 and the attaching surface 285a of the guide 285.

To make the friction coefficient $\mu 2$ between the lower surface 270a of the housing 270 and the attaching surface 285a of the guide 285 smaller than the friction coefficient $\mu 1$ between the back surface PG3a of the platen glass PG3 opposite the image reading surface and each of the projections 271 and the friction coefficient $\mu 3$ between the sliding surface 285A of the guide 285 and the guiding shaft 280, a highly slidable sheet member 286 is provided between the lower surface 270a of the housing 270 and the attaching surface 285a of the guide 285. The highly slidable sheet member 286 may be a piece of Teflon (a registered trademark) tape or a piece of metal tape (such as SUS tape).

Referring to FIG. 10, letting the force with which the urging members 262 urge the reading-portion body 261 upward be N1, a drag of N1/2 is generated between the back surface PG3a of the platen glass PG3 opposite the image reading surface and each of the projections 271. Accordingly, a frictional force F1=(N1/2+N1/2)×μ1 is generated between the back surface PG3a of the platen glass PG3 opposite the image reading surface and the projections 271.

In this case, a reaction force N1 with respect to the urging force exerted by the urging members 262 is generated between the lower surface 270a of the housing 270 and the attaching surface 285a of the guide 285. Accordingly, a frictional force F2=N1×μ2 is generated between the lower surface 270a of the housing 270 and the attaching surface 285a of the guide 285.

Furthermore, another reaction force N1 with respect to the urging force exerted by the urging members 262 is generated between the sliding surface 285A of the guide 285 and the guiding shaft 280. Accordingly, a frictional force F3=N1×μ3 is generated between the sliding surface 285A of the guide 285 and the guiding shaft 280.

If the friction coefficient μ2 between the lower surface 270a of the housing 270 and the attaching surface 285a of the guide 285 is smaller than the friction coefficient μ1 between the back surface PG3a of the platen glass PG3 opposite the image reading surface and each of the projections 271 and the friction coefficient μ3 between the sliding surface 285A of the guide 285 and the guiding shaft 280, the guide 285 moving with the movement of the carriage 25 is always positioned on a side of the carriage 25 that is opposite a side toward which the carriage 25 is moving, within the range defined by the length of the major axis of the oblong holes 270A.

That is, while the carriage 25 is moving in the sub-scanning direction, the housing 270 is always positioned ahead of the guide 285.

MODIFICATIONS

Figure 11:
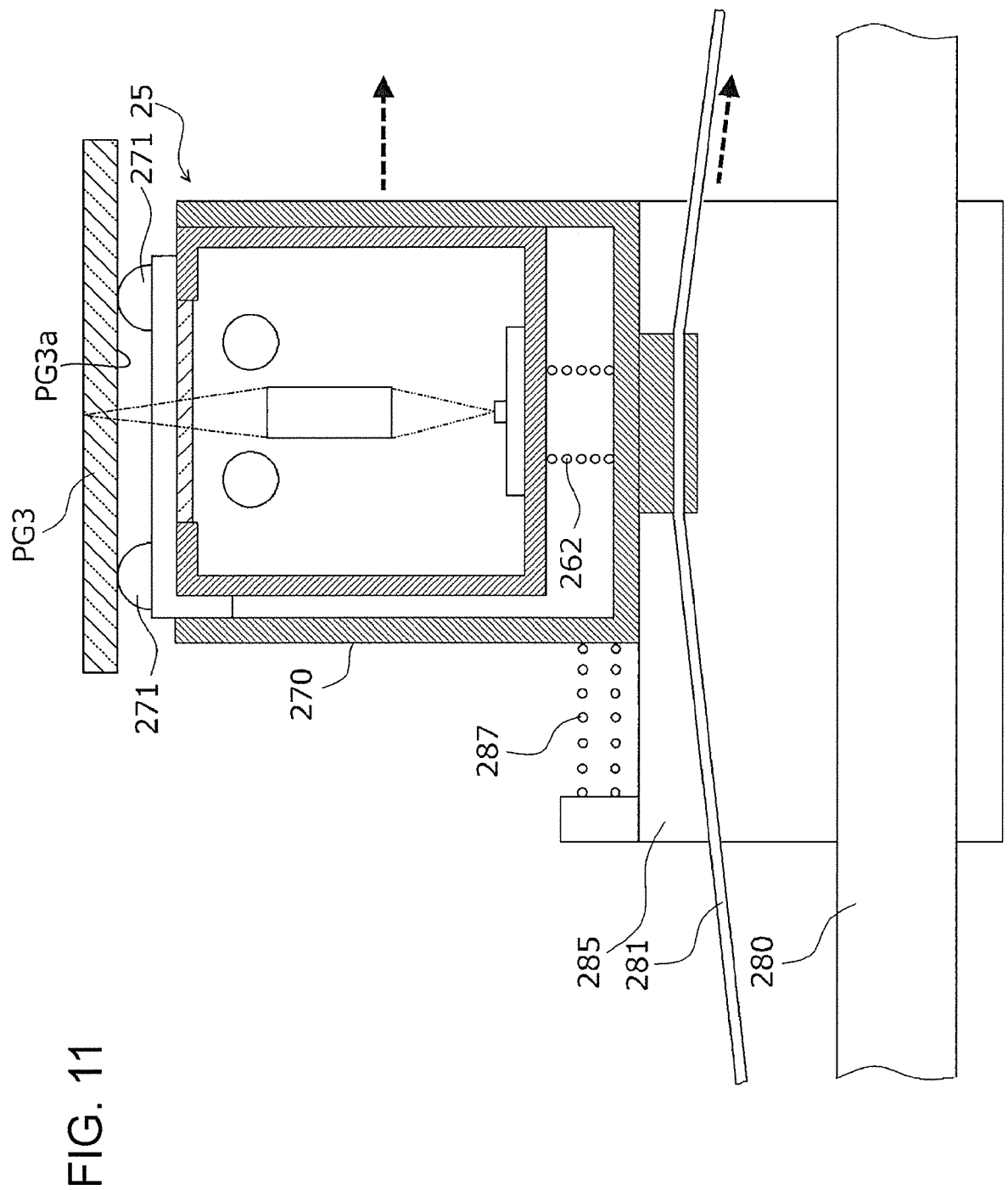
FIG. 11 is a schematic sectional view of a carriage guiding mechanism according to a modification.

FIG. 11 is a schematic sectional view of a carriage guiding mechanism according to a modification.

The carriage 25 illustrated in FIG. 11 is urged by an urging member 287 from the guide 285 in the sub-scanning direction, i.e. the moving direction. Hence, while the carriage 25 is moving in the sub-scanning direction, the housing 270 is always positioned ahead of the guide 285.

Figure 12:
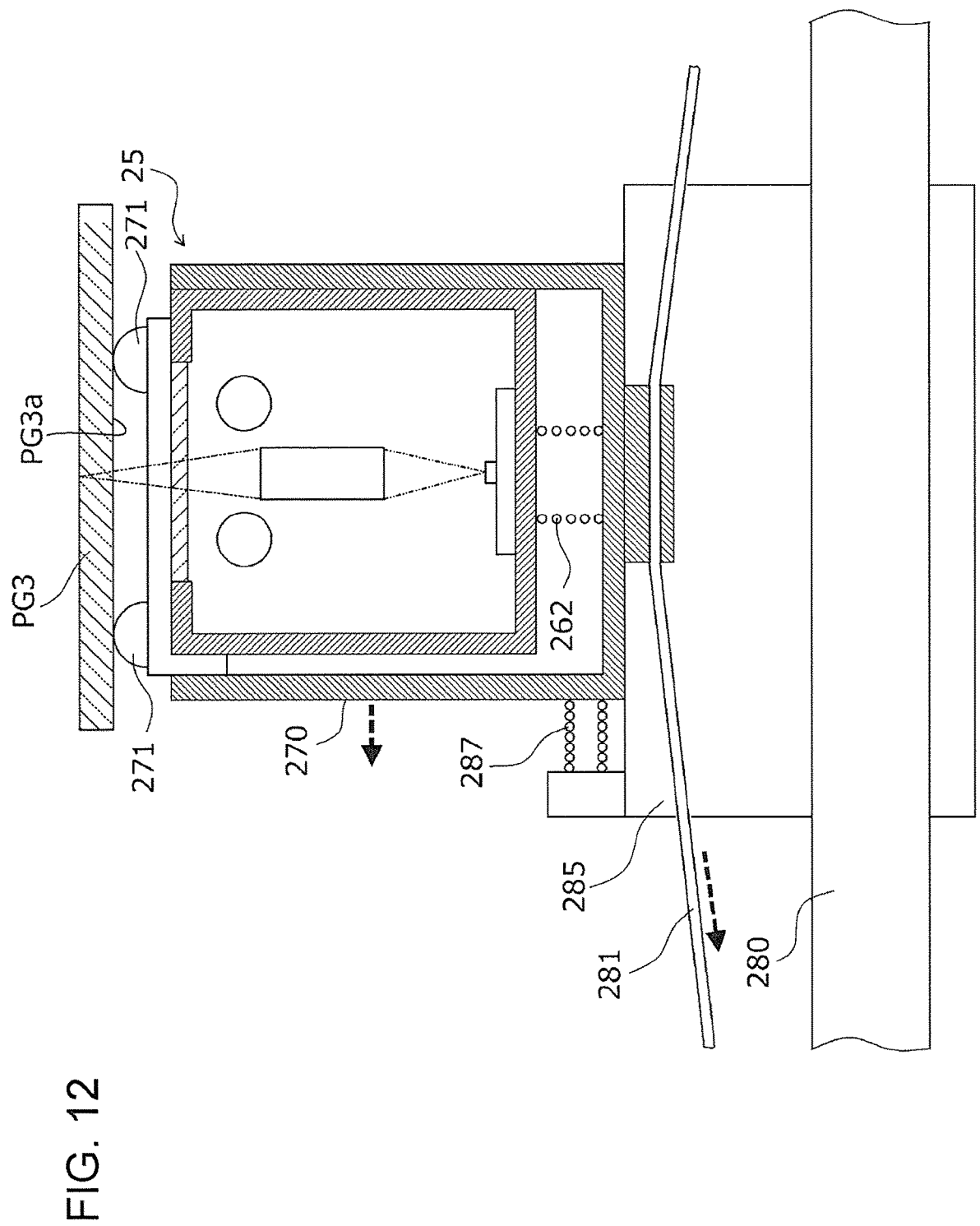
FIG. 12 is a schematic sectional view of the mechanism according to the modification in a state where the carriage has reached a starting position.

FIG. 12 is a schematic sectional view of the mechanism according to the modification in a state where the carriage 25 has reached the starting position. As illustrated in FIG. 12, when the carriage 25 has reached the starting position in the sub-scanning direction, the urging member 287 is compressed under a force that moves the belt 281. In this state, when a motor M (see FIG. 6) as a drive source that causes the belt 281 to endlessly travel is kept excited, the carriage 25 is retained at the starting position, with the urging member 287 being compressed.

The above description concerns a mechanism in which the guide 285 is movable relative to the housing 270 in the moving direction within the range defined by the length of the major axis of the oblong holes 270A. The guide may be provided on a side face of the housing 270 that is at one end in the direction intersecting the sub-scanning direction in such a manner as to be movable relative to the housing 270 in the sub-scanning direction.

FIG. 13 is a perspective view of a carriage guiding mechanism in which a guide 290 is attached to a side face of the housing 270. FIG. 14A is a schematic sectional view illustrating how the guide 290 is attached to the carriage 25. FIG. 14B is a schematic plan view illustrating how the guide 290 is attached to the carriage 25, with the reading portion 260 not illustrated. FIG. 15 is a schematic plan view illustrating how the carriage 25 moves in the case 24 of the image reading device 2.

The carriage 25 is provided with the guide 290 on a side face 270b of the housing 270 thereof that is at one end in the direction intersecting the moving direction. As illustrated in FIG. 14A, the guide 290 has a sliding surface 290A having a cylindrical shape when seen in the moving direction and at which the guide 290 slides on the guiding shaft 280.

As illustrated in FIGS. 14A and 14B, an attaching surface 290a of the guide 290 has a boss 290B. When the guide 290 is oriented to be attached to the carriage 25, the boss 290B projects toward the side face 270b of the housing 270. As illustrated in FIG. 14B, the side face 270b of the housing 270 has an oblong hole 270B in which the boss 290B is fitted. Therefore, the guide 290 is movable relative to the housing 270 in the moving direction within a range defined by the length of the major axis of the oblong hole 270B (see the arrow illustrated in FIG. 14B).

As described above, the guide 290 is attached to the housing 270 in such a manner as to be movable relative to the housing 270 in the moving direction (the sub-scanning direction). Therefore, referring to FIG. 15, as the belt 281 fixed to the housing 270 of the carriage 25 travels, the carriage 25 moves between the extreme ends of a movable range W (as illustrated by solid lines in FIG. 15) by moving relative to the guide 290, i.e. independently of the guide 290, at the extreme ends in the moving direction.

Consequently, the movable range of the carriage 25 is extended (by a length L illustrated in FIG. 15) at each of two ends of a movable range W0 realized in a case where the guide 290 is fixedly attached to the housing 270 of the carriage 25 (illustrated by two-dot chain lines in FIG. 15).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
   an image reading unit that reads an image while moving in a sub-scanning direction;
   a casing that houses the image reading unit, and having an oblong hole;
   a guiding member that is movable relative to the casing in the sub-scanning direction and guides the casing in the sub-scanning direction, and having a boss; and
   an endless member to which the casing is fixed and that endlessly travels between a starting position and a terminal position in the sub-scanning direction,
   wherein the boss is disposed in the oblong hole.

2. The image reading device according to claim 1, wherein the guiding member is provided on a side face of the casing that is at one end in a direction intersecting the sub-scanning direction.

3. The image reading device according to claim 2,
wherein the endless member is stretched such that a tension component acting in a downward direction intersecting a direction in which the endless member moves is generated between the starting position and the terminal position in the sub-scanning direction.

4. The image reading device according to claim 2,
wherein while the casing is moving in the sub-scanning direction, the casing is positioned ahead of the guiding member within a range in which the casing is movable relative to the guiding member.

5. The image reading device according to claim 4,
wherein a friction coefficient ($\mu 1$) between the image reading unit and a back surface of a platen glass on a front surface of which a sheet having the image is to be placed is greater than a friction coefficient ($\mu 2$) between the casing and the guiding member, and a friction coefficient ($\mu 3$) between the guiding member and a guiding shaft that guides the guiding member in the sub-scanning direction is greater than the friction coefficient ($\mu 2$) between the casing and the guiding member.

6. The image reading device according to claim 4,
wherein the casing is urged from the guiding member in the sub-scanning direction, and
wherein while the casing is moving in the sub-scanning direction, the casing is positioned ahead of the guiding member.

7. The image reading device according to claim 1,
wherein the guiding member is provided on a central part of the casing in a direction intersecting the sub-scanning direction.

8. The image reading device according to claim 7,
wherein the endless member is stretched such that a tension component acting in a downward direction intersecting a direction in which the endless member moves is generated between the starting position and the terminal position in the sub-scanning direction.

9. The image reading device according to claim 7,
wherein while the casing is moving in the sub-scanning direction, the casing is positioned ahead of the guiding member within a range in which the casing is movable relative to the guiding member.

10. The image reading device according to claim 9,
wherein a friction coefficient ($\mu 1$) between the image reading unit and a back surface of a platen glass on a front surface of which a sheet having the image is to be placed is greater than a friction coefficient ($\mu 2$) between the casing and the guiding member, and a friction coefficient ($\mu 3$) between the guiding member and a guiding shaft that guides the guiding member in the sub-scanning direction is greater than the friction coefficient ($\mu 2$) between the casing and the guiding member.

11. The image reading device according to claim 9,
wherein the casing is urged from the guiding member in the sub-scanning direction, and
wherein while the casing is moving in the sub-scanning direction, the casing is positioned ahead of the guiding member.

12. The image reading device according to claim 1,
wherein the endless member is stretched such that a tension component acting in a downward direction intersecting a direction in which the endless member moves is generated between the starting position and the terminal position in the sub-scanning direction.

13. The image reading device according to claim 12,
wherein while the casing is moving in the sub-scanning direction, the casing is positioned ahead of the guiding member within a range in which the casing is movable relative to the guiding member.

14. The image reading device according to claim 13,
wherein a friction coefficient ($\mu 1$) between the image reading unit and a back surface of a platen glass on a front surface of which a sheet having the image is to be placed is greater than a friction coefficient ($\mu 2$) between the casing and the guiding member, and a friction coefficient ($\mu 3$) between the guiding member and a guiding shaft that guides the guiding member in the sub-scanning direction is greater than the friction coefficient ($\mu 2$) between the casing and the guiding member.

15. The image reading device according to claim 13,
wherein the casing is urged from the guiding member in the sub-scanning direction, and
wherein while the casing is moving in the sub-scanning direction, the casing is positioned ahead of the guiding member.

16. An image forming apparatus comprising:
the image reading device according to claim 1 that reads an image on a sheet; and
an image recording unit that records the image read by the image reading device on a recording medium.

17. An image reading device comprising:
an image reading unit that reads an image while moving in a sub-scanning direction;
a casing that houses the image reading unit;
a guiding member that is movable relative to the casing in the sub-scanning direction and guides the casing in the sub-scanning direction; and
an endless member to which the casing is fixed and that endlessly travels between a starting position and a terminal position in the sub-scanning direction,
wherein while the casing is moving in the sub-scanning direction, the casing is positioned ahead of the guiding member within a range in which the casing is movable relative to the guiding member.

18. The image reading device according to claim 17,
wherein a friction coefficient ($\mu 1$) between the image reading unit and a back surface of a platen glass on a front surface of which a sheet having the image is to be placed is greater than a friction coefficient ($\mu 2$) between the casing and the guiding member, and a friction coefficient ($\mu 3$) between the guiding member and a guiding shaft that guides the guiding member in the sub-scanning direction is greater than the friction coefficient ($\mu 2$) between the casing and the guiding member.

19. The image reading device according to claim 17,
wherein the casing is urged from the guiding member in the sub-scanning direction, and
wherein while the casing is moving in the sub-scanning direction, the casing is positioned ahead of the guiding member.

20. The image reading device according to claim 17,
wherein a highly slidable sheet member is provided between the casing and the guiding member.

* * * * *